Feb. 6, 1940.    A. A. MacDONELL    2,189,213
ANIMAL FEEDING METHOD
Filed Aug. 9, 1938    2 Sheets-Sheet 1
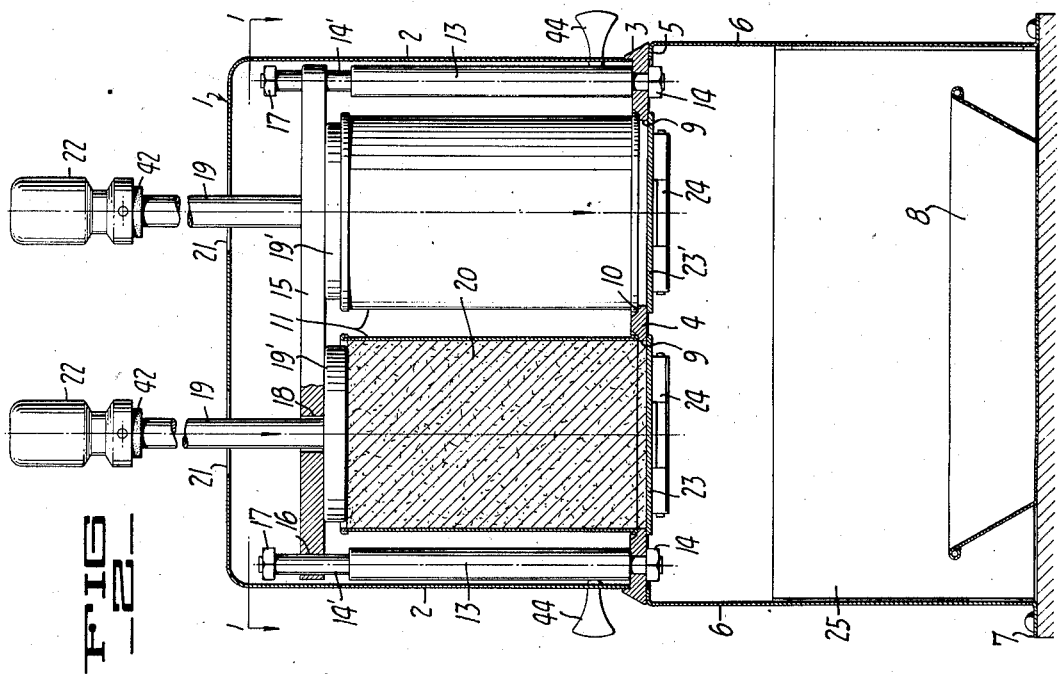
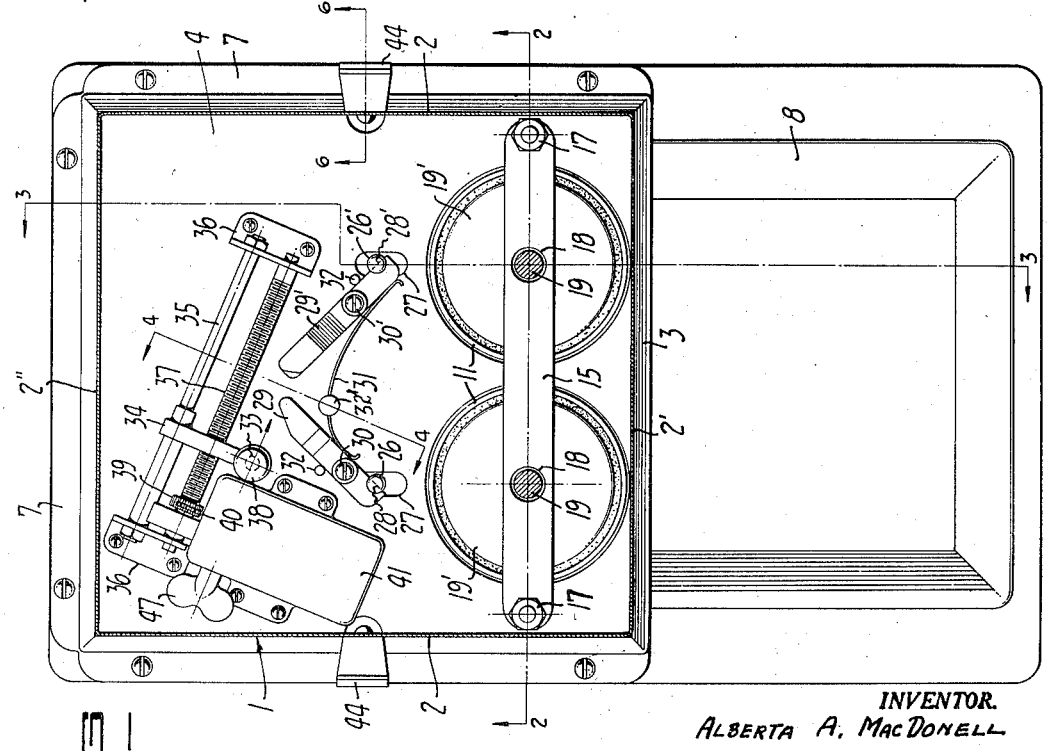
INVENTOR.
ALBERTA A. MacDONELL
BY
Boyken & Mohler
ATTORNEYS.

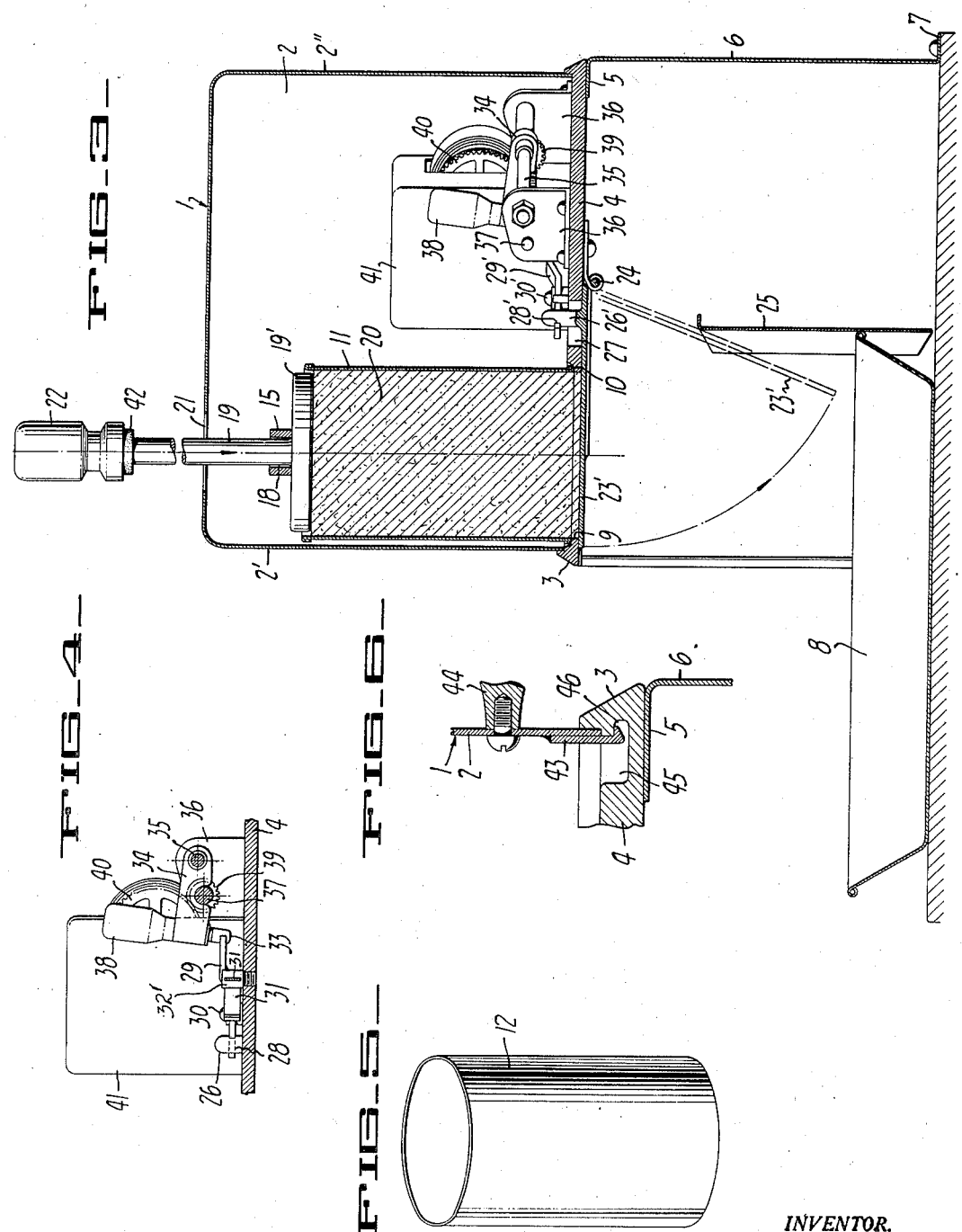

Patented Feb. 6, 1940

2,189,213

UNITED STATES PATENT OFFICE 2,189,213

ANIMAL FEEDING METHOD

Alberta A. MacDonell, San Francisco, Calif.

Application August 9, 1938, Serial No. 223,865

1 Claim. (Cl. 119—56)

This invention relates to an animal feeder, and has for its objects a simple, reliable device for automatically dispensing at a predetermined time or times dog or cat food or the like, either from the can, where canned food is used, or from a container for the food, and which device is easy to clean, safe, and cannot be accidentally actuated by the animal, and is economical to manufacture. Other objects and advantages will appear in the specification and drawings annexed hereto.

In the drawings, Fig. 1 is a horizontal sectional view of my invention taken along line 1—1 of Fig. 2, with part of the cover broken away to expose certain elements.

Fig. 2 is a sectional view of the invention as seen from line 2—2 of Fig. 1.

Fig. 3 is a sectional view of the invention as seen from line 3—3 of Fig. 1.

Fig. 4 is an enlarged fragmentary view, partly in section, as seen from line 4—4 of Fig. 1.

Fig. 5 is a perspective view of one of the open-ended cylinders that may be used for containing the food to be dispensed.

Fig. 6 is a sectional view of one of the cover latches taken along line 6—6 of Fig. 1.

Briefly described, my invention comprises a device for automatically feeding an animal, such as a dog or cat, at a predetermined time or times, whereby the animal will be properly fed in the owner's absence.

The average size dog requires one feeding of about one pound of prepared dog food once every twenty-four hours, and for a smaller dog or cat, about one-half pound is sufficient. Since dog and cat food, whether prepared by the owner or whether obtained in cans in a prepared state, contains a certain amount of moisture and is relatively sticky, ordinary methods of ejecting the food from a container are impractical or unreliable. Also, I have found that too rapid an ejection of the food tends to frighten some animals, causing them to hesitate approaching the food until long after the food has been ejected, while any device with exposed mechanism driven by positive power is many times dangerous to the animal, since its unexpected operation may bruise or cut an inquisitive animal. Also in a dog and cat feeding device, where food is held from twenty-four to forty-eight hours, it is necessary that the food be substantially fully enclosed until ejected to prevent spoilage and excessive drying.

My invention, hereinafter described in detail, incorporates the desired advantages of a feeding device of the character described above, and overcomes the difficulties noted. Said device provides for automatically dispensing prepared dog and cat food, either directly from the can in which commercially prepared food is obtained, or from a receptacle of the same shape. Provision is made for a first feeding operation at any desired time up to about twenty-four hours, and a subsequent feeding about twenty-four hours thereafter. From the disclosure it is obvious that the number of feedings and time intervals may be increased or decreased as desired without departing from the invention.

In detail, the embodiment of the invention as disclosed in the drawings consists of a cover provided with a top 1, opposed lateral sides 2, and front side 2' and rear side 2''. The lower side of the cover is open and the lower edges of the sides are supported just within upstanding flanges 3 formed on a horizontal partition 4. Said partition 4 is supported on flanges 5 that are formed around the upper edges of the vertical walls 6 of a supporting base member, which walls at their lower edges may be provided with flanges 7 for bolting to the floor or any desired supporting surface. The side of the base member below the forward side 2' of the cover is open and the area below the partition 4 is the feeding chamber into which the food is dispensed and which food is accessible to the dog or cat through the open side, although, as will hereinafter be described, the food will normally be directed to a position outwardly of, or at least partially outwardly of, said chamber and onto a pan 8 that extends at one end into said chamber, and which pan is supported on the surface that supports walls 6.

The partition itself is formed adjacent the forward side of the cover with a pair of circular openings 9, in side by side relation, the upper edge of each of which openings is rabbeted to provide an annular, upwardly facing, supporting shoulder 10 for the lower edge of an ordinary, standard diameter, cylindrical, 1 lb. can 11 of dog food, or a cylinder 12 (Fig. 5), as desired. The vertical sides of the openings extending upwardly from the shoulders 10 insures axial centering of the cans over the openings and against lateral shifting of the cans 11 or cylinders 12, according to which is used.

Adjacent each of the sides 2 of the cover and the plane in which the axes of the openings 9 are disposed I provide a vertical post 13. The lower ends of posts 13 are of reduced diameter which ends extend through the partition and flanges 5 and are threaded to receive nuts 14 below the partition for bolting the posts to the partition and for supporting the posts vertical and rigid relative to said partition.

From partition 4 the posts 13 extend upwardly, and are of uniform diameter to a point about level with the upper edges of the cans 11, and above said point they are of reduced diameter, to their upper ends, which upper ends terminate in threaded portions below the top 1.

A flat cross bar 15 extends across the cans and across their central axes, the opposite ends of which bar are formed with openings 16 adapted to relatively loosely receive the reduced diameter ends 14' of posts 13, but which openings will not pass over posts 13, thus the bar will rest at its ends on the shoulders at the junctures of posts 13 and the portions 14' when the bar is in its lowermost position. The threaded upper ends of posts 13 threadedly engage nuts 17 which prevent removal of the bar 15 from portions 14' unless the nuts are removed, but said bar is readily removed from the posts when the nuts are removed.

The bar 15 is also provided with vertical openings 18, respectively in vertical axial alignment with the openings 9, and a solid, vertical, cylindrical rod 19 extends relatively loosely through each of said openings 18.

Each of the rods 19 is provided at its lower end with a relatively heavy, horizontal, circular disk 19' that is adapted to freely enter the upper open end of can 11 for resting on and substantially covering the food 20 within each can, and the upper end of each rod 19 extends upwardly through an opening 21 in top 1 of the cover. The uppermost end of each rod 19 is provided with a relatively heavy cylindrical handle 22 of larger diameter than the rod 19, and openings 21 are of sufficient diameter to pass freely over said handles. Rods 19 with disks 19' are virtually plungers.

Below partition 4 and below openings 9, are trap doors 23, 23' that are hinged at 24 (Fig. 3) for swinging downwardly from their forward edges adjacent the open side of the feeding compartment to the inclined dotted position indicated in Fig. 3, which doors are supported in said inclined positions by a partition 25 that extends across the feeding compartment.

The doors 23, 23' are normally held in a horizontal position substantially against the lower side of partition 4, and covering the openings 9, by short cylindrical lugs 26, 26' projecting upwardly from the upper side of each door. Openings 27 in the partition permit said lugs to pass upwardly through the partition when the doors are in opening covering position over openings 9, and the upwardly projecting ends of said lugs 26 are each slotted along one side as at 28, 28' for receiving in each slot an edge of separate latches 29, 29' respectively vertically pivoted at 30, 30' for swinging of the latches out of the slots, and to thereby permit the doors 23, 23' to drop.

The latches 29, 29' extend convergently from lugs 26, 26', but are spaced apart at their ends remote from the lugs, and said ends are elevated above the partition 4 while the ends of the latches adapted to enter said slots or notches 28, 28', are yieldably urged into slot engaging position by a flat spring 31 held between the latches by a support 32' intermediate its ends in a position with the ends of the spring under tension against the adjacent sides of the respective latches. One end of spring 31 engages the side of latch 29 outwardly of pivot 30 relative to lug 28 while the opposite end of the spring engages the latch 28' at a point between lug 26' and pivot 30'. Thus movement of the outer ends of the latches in one direction will release the latches and permit the trap doors to drop, and when the lugs are carried downwardly with the doors and the latches are released, stop 32 on the partition will prevent the ends of the latches from moving across the openings 27 for said lugs.

The outer ends of said latches are adapted to be actuated in succession by means of a short post 33 (Fig. 4), which is mounted on the outer end of a block 34, the inner end of said block being slidably secured on a horizontally extending rod 35 for sliding longitudinally of said rod.

The rod 35 is secured at its ends in brackets 36 that are secured to partition 4, and said rod is spaced horizontally from, but extends across the outer ends of latches 29, 29' so that upon movement of the post 33 with said block along said rod 35, the post will engage the outer ends of latches 29, 29' in succession and will release the latches from the lugs 26, 26' to permit the doors 23, 23' to successively drop.

The movement of said block 34, and the post 33 secured thereto, is effected by an externally, threaded shaft 37 that extends parallel with the rod 35, and which shaft is disposed between the rod 35 and the latches 29, 29'. The underside of block 34 is formed with a threaded, semi-cylindrical, downwardly facing recess that fits over the shaft 37, with the threads of the recess engaging the threads of the shaft, and the end of block 34 over post 33, is provided with a weighted handle 38, which handle, together with the weight of the block, firmly holds the threads on the block in firm engagement with the threads on the shaft, but upon lifting on the handle, the block will pivot on rod 35 to a position with the threads disengaged, and the block may then be slid horizontally along rod 35 to any desired position for re-engaging the threads at the desired point.

The shaft 35 is rotatably supported at its ends by brackets 36, and a spur gear 39 (Fig. 1) is secured on one end of said shaft, which gear is in mesh with the drive gear 40 of a spring or synchronous electric motor 41.

The rate of rotation of shaft 37 by the drive gear is such that the block 34, commencing from a position nearest the gear 39, will be carried to latch 29 in twenty-four hours, when post 33 will engage the outer end of the latch and release trap door 23 and twenty-four hours more will elapse before post 33 engages the outer end of latch 29' to release trap door 23'.

The outer end of latch 29 terminates in a position whereby the post 33 will slide past the end of the latch after the latch is moved thereby to release the door 23, but the outer end of latch 29' is elevated a distance greater than the outer end of latch 23, and extends closer to shaft 37 so that the post 33 will not pass the end of the latch but will engage the side of the latch adjacent latch 29 and since the side of latch 29' that engages the post 33 extends obliquely to the path of travel of said post, after the latch 29' has released door 23', the continued movement of the block by shaft 37 will automatically cause the block to pivot upwardly on rod 35 and to disengage the threads of the block from the shaft, thus the motor 41 may run indefinitely thereafter without moving the block. Of course a switch may be actuated by the block to stop a synchronous motor, if desired, but for general use, the means shown is the most simple and is positive, and is most readily adapted to any type of motive power irrespective of whether a spring or electricity is used.

Upon trap door 23 being released, as above described, the food 20 within the can is slowly and positively forced out of the can or cylinder 12, as the case may be, by the gravitational force of the weighted plunger 19'. Upon the food dropping from the can, it will strike the inclined door and will be deflected into the portion of pan 8 that is outwardly of the compartment directly below the opening 9. The same action occurs when door 23' is released.

The length of rod 19 is such that the lower surface of disk 19' is substantially flush with the lowermost end of the can when all of the food is ejected, and a rubber washer 42 on each rod 19 below handle 22 will engage the bar 15 to support the rod and disk in said position, and to prevent unnecessary noise and wear if the plunger should suddenly drop to its lowermost position.

The cover of the device is releasably held in positively locked position over the door actuating mechanism by latches 43 (Fig. 6) carried on cover sides 2, which sides also carry outwardly projecting handles 44 on their outer sides, and the partition 4 is recessed at 45 for receiving the latches. When the handles 44 are grasped and the sides 2 forced slightly inwardly toward each other the latches will disengage lugs 46 in the outer sides of recesses 45 and the cover may be readily lifted from the partition and removed from the device. Thus, when the cover is in position, the animal cannot possibly cause its removal by attempting to gain access to the food, and since the latches 29, 29' positively hold the trap doors locked in position, the doors cannot be released, except by positive actuation of latches 29, 29', which latches are fully enclosed. Also, the sides of the cans or cylinders, and the doors 23, 23', together with the disks or plungers 19', substantially fully enclose the food against spoilage or excessive drying.

In operation, commencing with the loading of the device, the operator first removes the cover, and then raises the plungers 19' by handles 22 to their full height, carrying bar 15 upwardly until the ends of the bar engage nuts 14'. The cans 11, from which opposite ends have been removed, or the cylinders 12, with food therein, are then readily inserted in position on shoulders 10 that are around opening 9. Since the upper ends of lugs 26, 26' are rounded, the outer ends of latches 29, 29' automatically slide over said ends and into the slots 28, 28' upon swinging the doors upwardly to closed position below the food in the cans. The plungers are thereafter released and disks 19' will rest on the food within the cans, ready to push the food out of the lower ends of the cans as soon as the doors drop.

If the motor 41 is of the spring type, it is then wound by a key 47 and block 34 is moved next to the motor in thread engaging position relative to shaft 37, upon which the motor commences to move the block along shaft 37 to actuate latches 29, 29' at about twenty-four hour intervals. The cover is then replaced in locked position on partition 4 and nothing further is required.

If one feeding only is desired, only the first can is filled with food, and any desired amount of food may be placed in one or both cans. The initial positioning of block 34 on the shaft will determine the time of the first or only feeding, as the case may be, since if it is midway between latch 29 and the extreme end position, the feeding will occur in 12 hours. No object is accomplished by varying the second feeding, since the proper time is twenty-four hours after the first feeding, but obviously the outer end of latch 29' may be extended or shortened to vary the time of said feeding.

The only parts of my device in engagement with the food are disks or plungers 19', the removable cans or cylinders, the edges of openings 9 and the trap doors and pan 8, all of which parts are simple, smooth and therefore readily cleaned. If desired, the operator may remove the plungers from the device by merely removing nuts 17.

Since the plungers 19' are never exposed, and since the trap doors 23, 23' merely fall by gravity, the animal cannot possibly be injured by any of the moving parts, and the action of the weighted plungers is positive, thus the only possible failure in the operation of the device is the total failure of motor 41 to function. Under all conditions, I have found a spring motor to be most reliable, since it is not susceptible to failure through current interruptions and has far more than sufficient power to actuate the latches.

Having described my invention, I claim:

The method of dispensing hermetically sealed, canned dog food for consumption that comprises the steps of removing opposite ends of the can that contains the food, then positioning the food between movable surfaces covering the exposed food at opposite ends of the can while supporting the food between said surfaces by the sides of the can and thereafter and at a predetermined time after removal of said ends, moving one of said movable surfaces away from the food at one of said ends of the can and moving the other surface axially through the can to thereby eject the food out of the open end from which said one of the movable surfaces has been removed.

ALBERTA A. MacDONELL.